(12) United States Patent
Kalina

(10) Patent No.: US 8,281,592 B2
(45) Date of Patent: Oct. 9, 2012

(54) DIRECT CONTACT HEAT EXCHANGER AND METHODS FOR MAKING AND USING SAME

(76) Inventor: Alexander I. Kalina, Hillsborough, CA (US)

( * ) Notice: Subject to any disclaimer, the term of this patent is extended or adjusted under 35 U.S.C. 154(b) by 641 days.

(21) Appl. No.: 12/533,949

(22) Filed: Jul. 31, 2009

(65) Prior Publication Data

US 2011/0024084 A1 Feb. 3, 2011

(51) Int. Cl.
*F01K 25/08* (2006.01)
*F01K 25/00* (2006.01)
*F01K 7/00* (2006.01)

(52) U.S. Cl. .............................. 60/651; 60/671; 60/673
(58) Field of Classification Search .................... 60/651, 60/671, 673
See application file for complete search history.

(56) References Cited

U.S. PATENT DOCUMENTS

| | | | | |
|---|---|---|---|---|
| 3,908,381 A * | 9/1975 | Barber et al. | ................. | 60/641.4 |
| 3,967,450 A * | 7/1976 | Girardier | ........................ | 60/657 |
| 4,041,708 A * | 8/1977 | Wolff | ............................... | 60/649 |
| 4,137,720 A * | 2/1979 | Rex | ............................... | 60/641.2 |
| 4,281,514 A * | 8/1981 | Egerer | ......................... | 60/641.1 |
| 4,545,207 A * | 10/1985 | Neary | ............................... | 60/645 |
| 4,816,121 A * | 3/1989 | Keefer | ............................ | 204/156 |
| 5,133,190 A * | 7/1992 | Abdelmalek | ................... | 60/648 |
| 5,161,377 A * | 11/1992 | Muller et al. | ................... | 60/653 |
| 5,557,936 A * | 9/1996 | Drnevich | ........................ | 60/649 |
| 6,035,641 A * | 3/2000 | Lokhandwala | ................ | 60/649 |
| 6,161,386 A * | 12/2000 | Lokhandwala | ................ | 60/649 |
| 6,817,182 B2 * | 11/2004 | Clawson | ........................ | 60/670 |
| 6,968,690 B2 * | 11/2005 | Kalina | ............................ | 60/649 |
| 7,845,173 B2 * | 12/2010 | Oser et al. | ....................... | 60/649 |
| 8,046,999 B2 * | 11/2011 | Doty | ............................... | 60/649 |
| 2003/0167768 A1 * | 9/2003 | Clawson | ........................ | 60/670 |
| 2009/0205337 A1 * | 8/2009 | Oser et al. | ....................... | 60/651 |

* cited by examiner

*Primary Examiner* — Thomas Denion
*Assistant Examiner* — Brian Inacay
(74) *Attorney, Agent, or Firm* — Robert W Strozier

(57) ABSTRACT

A direct heat exchange method and apparatus for recovering heat from a liquid heat source is disclosed, where the method includes contacting a liquid heat source stream with a multi-component hydrocarbon fluid, where the hydrocarbon fluid compositions has a linear or substantially linear temperature versus enthalpy relationship over the temperature range of the direct heat exchange apparatus.

9 Claims, 6 Drawing Sheets

DIRECT CONTACT HEAT EXCHANGER AND METHODS FOR MAKING AND USING SAME

BACKGROUND OF THE INVENTION

1. Field of the Invention

Embodiments of this present invention relate to a direct heat exchange method and apparatus for recovering heat from a liquid heat source.

Embodiments of this present invention relate to a direct heat exchange method and apparatus for recovering heat from a liquid heat source, where the method includes contacting a liquid heat source stream with a multi-component hydrocarbon fluid, where the hydrocarbon fluid compositions has a linear or substantially linear temperature versus enthalpy relationship over the temperature range of the direct heat exchange apparatus.

2. Description of the Related Art

Highly mineralized geothermal brine, which is cooled in a heat recovery process will, at some given temperature, start to release or precipitate solid minerals (mostly silica). The precipitating solid materials settle out on surfaces of heat transfer equipment drastically reducing the heat transfer coefficient of the equipment. After some time, the contaminated heat exchange equipment will become completely blocked and unworkable.

In prior art, this problem was addressed using a direct contact heat exchange apparatus. In these prior art direct contact heat exchange apparatuses, an immiscible liquid heat transfer fluid is was brought into direct contact in a counter-flow relationship with the liquid heat source. The heat transfer fluid is heated as the heat source liquid is cooled.

Because the heat source liquid and the heat transfer fluid in this arrangement both have practically constant specific heat values, the heat recovery in this process is thermodynamically very efficient. Moreover, the heat transfer coefficients in such direct contact heat exchange apparatuses are higher than in conventional heat exchange apparatus.

In this approach, as the heat transfer fluid and the heat source liquid move in counter-flow, the only driving force for this movement is a difference in specific gravities of the fluids.

For purposes of heat recovery from geothermal brines, oils or liquid hydrocarbons are usually used as the heat recovery liquid.

Because the difference in the specific gravities of the heat transfer fluid and the heat source fluid is usually quite small, the velocity with which both liquids move in the direct heat exchange apparatus has to be quite low to avoid flooding.

An alternate approach in the prior art was used by the Barber-Nichols Company, where an Organic Rankine Cycle (ORC) working fluid (usually isobutane or isopentane) was vaporized in direct contact with a geothermal brine in a counter-flow relationship. However, a single component working fluid boils at a constant temperature, whereas the heat released by the geothermal brine is released at variable temperatures or over a temperature range. Therefore, this prior art approach, while useful for the vaporization of a single component ORC working fluid, is not efficient for heat recovery in cases where the heat exchange fluid is then used to transfer heat to an alternate working fluid of a power cycle (or, for that matter, to any other fluid for other applications.)

Thus, there is a need in the art for a novel method and apparatus for direct heat exchange from a heat source to a fluid designed to have a change enthalpy that is linear with the change in temperature along the length of an active heat exchange zone.

SUMMARY OF THE INVENTION

Embodiments of methods of this invention include bringing a heat source fluid into direct contact with a multi-component heat carrier fluid in a counter-flow relationship to form a spent heat source fluid and a vaporized or partially vaporized multi-component heat carrier fluid, where the fluids are immiscible and where the carrier fluid has a linear or substantially linear temperature versus enthalpy relationship over a temperature range of the direct contact heat exchange apparatus and where the two fluid have the same or substantially the same pressure.

Embodiments of methods of this invention including pressurizing a heat source stream to a pressure of a multi-component heat carrier fluid. The pressurized heat source fluid is then brought into direct contact with a multi-component heat carrier fluid in a counter-flow relationship to form a spent heat source fluid and a vaporized or partially vaporized multi-component heat carrier fluid, where the fluids are immiscible and where the carrier fluid has a linear or substantially linear temperature versus enthalpy relationship over a temperature range of the direct contact heat exchange apparatus and where the two fluid have the same or substantially the same pressure. The vaporized or partially vaporized multi-component heat carrier fluid is then used as the heat source for heating a working fluid of a power cycle or for heating any other fluid for use an a subsequent process.

Embodiments of this invention provide a system including a direct heat exchange subsystem, a heat exchange subsystem and heat utilization subsystem.

Embodiments of this invention provide a system including a direct heat exchange subsystem and a heat exchange subsystem.

Embodiments of this invention provide a heat transfer fluid having a linear or substantially linear relationship between its enthalpy and temperature over a desired temperature range.

Embodiments of this invention provide a system including a direct contact heat exchange subsystem, a heat exchange subsystem and a heat utilization subsystem, where the heat exchange subsystem include a single heat exchange apparatus and the direct heat exchange subsystem and the heat exchange subsystem utilize a multi-component heat carrier fluid having a linear enthalpy to temperature relationship over an operating temperature range of the direct heat exchange apparatus.

Embodiments of this invention provide a system including a direct contact heat exchange subsystem, a heat exchange subsystem and a heat utilization subsystem, where the heat exchange subsystem includes two heat exchange apparatuses, one adapted to cool a hot heat source stream to a temperature suitable for use with the direct heat exchange apparatus and the direct heat exchange subsystem and the heat exchange subsystem utilize a multi-component heat carrier fluid having a linear enthalpy to temperature relationship over an operating temperature range of the direct heat exchange apparatus.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
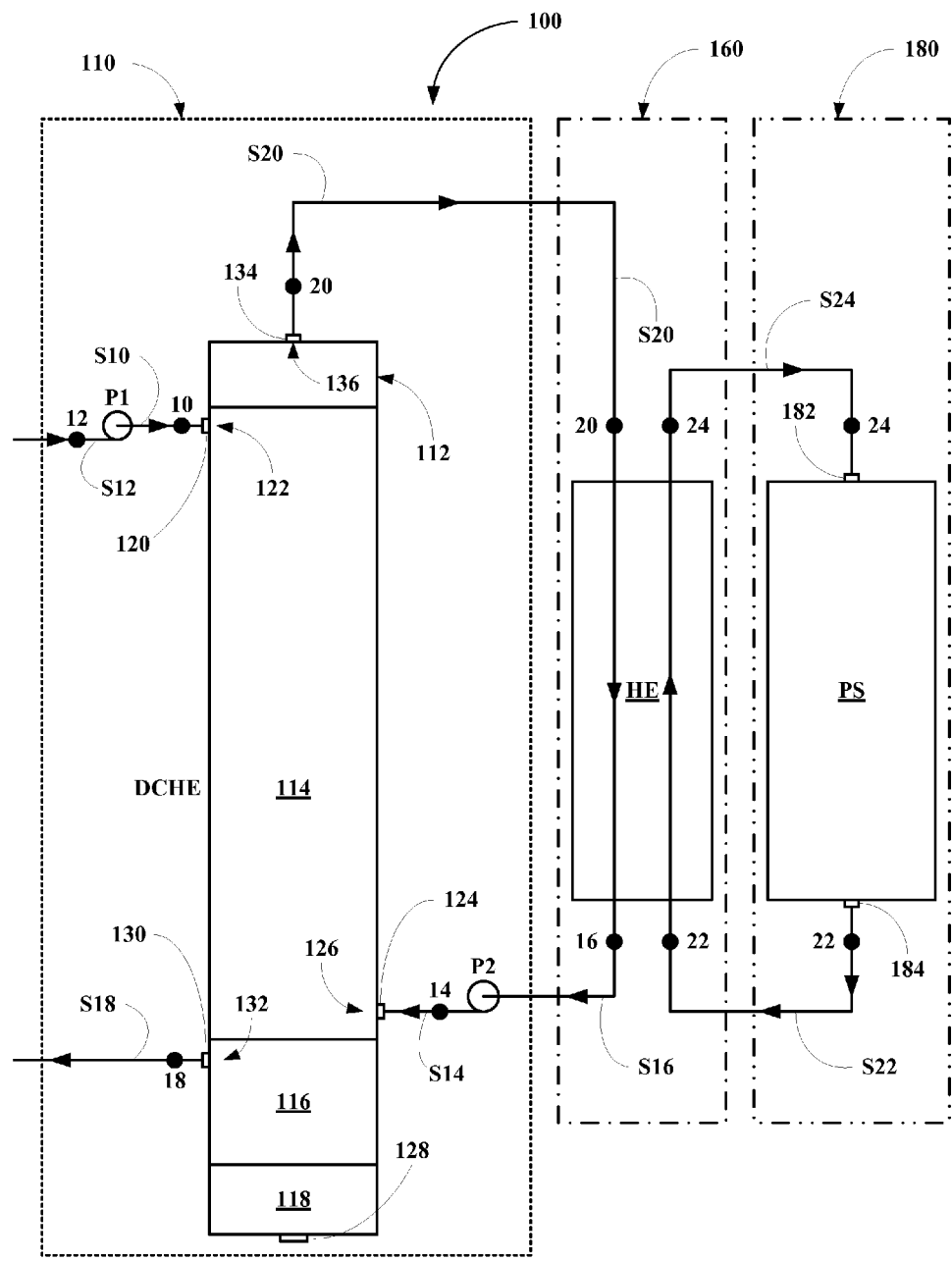
FIG. 1 depicts an embodiment of an integrated heat extraction and use system.

The inventor has found that a method, apparatus and system can be constructed to recover heat from a liquid heat source using a direct heat transfer method and apparatus from the heat source to a system designed to utilize the heat is impossible or undesirable. In certain embodiments, the method and apparatus are used to recover heat from a highly mineralized geothermal brine so that it can be used to heat a working fluid of a power system.

To attain efficient heat recovery from liquid heat sources with the use of boiling heat transfer fluid, the boiling of the heat transfer fluid has to occur at variable temperature which covers the whole range of the temperature change of the heat source liquid. Moreover, the temperature difference between the heat source liquid and the boiling heat transfer fluid has to be maintained to be constant of close to constant throughout the entire process.

In other words, the change in enthalpy of the boiling heat transfer fluid must be linear with the change of its temperature.

The proposed invention uses a multi-component mixture of hydrocarbons as its heat transfer fluid. At least four different hydrocarbons make up the mixture. Propane, isobutane, pentane, hexane, heptane, octane, nonane and decane can be used as components of such a mixture.

In the proposed invention, the mixture is chosen in such a way that the boiling process of the mixture presents a nearly straight line in coordinates of enthalpy vs. temperature. One experienced in the art will be able to choose a workable combination of four or more of the suggested components to comprise the heat transfer fluid mixture.

The multi-component heat carrying fluid mixture (or "multi-component heat carrier," hereafter MCHC) is used in a direct contact heat exchanger which is a vertical vessel. This can be conceptually divided into three parts. At the top is a space where the heated and vaporized MCHC accumulates. In the middle is the region where the heat source liquid and the MCHC come into direct contact in counter-flow and the MCHC boils. At the bottom, the cooled heat source liquid and the precipitated mineralization are collected. The bottom section of the vessel can be made of a larger diameter than the middle and top portions of the vessel. This reduces the velocity of the brine as it settles into the bottom and allows any MCHC that may have been carried down by the brine to float back up.

Embodiments of the present invention utilize a multi-component hydrocarbon fluid as a heat transfer fluid. The multi-component hydrocarbon or multi-component heat carrier (MCHC) fluid includes a mixture of at least four different hydrocarbons. Depending on an initial temperature of the heat source fluid and a temperature profile across an active heat exchange zone of the direct heat exchange apparatus, the exact MCHC fluid composition can vary and can be optimized for the temperature of the heat source fluid and the a temperature profile across an active heat exchange zone of the direct heat exchange apparatus.

Suitable hydrocarbons for use in a MCHC fluid of this invention include, without limitation, linear or branched C1-C20 alkanes, linear or branched C1-C20 alkenes, linear or branched C1-C20 cycloalkanes, linear or branched C1-C20 cycloalkenes, linear or branched C6-C20 aromatics, other C1-C20 hydrocarbons, where one or more carbon atoms can be replaced by hetero atoms such as oxygen atoms and where one or more hydrogen atoms can be replaced by halogen atoms such as fluorine atoms, chlorine atoms or mixtures thereof. The hydrocarbons can also be C2-C20 ethers, C3-C20 esters, C1-C20 fluorinated hydrocarbons, C1-C20 chlorinated hydrocarbons, or mixtures thereof. Exemplary hydrocarbons include, without limitations, ethane, propane, isopropane, butane, isobutane, pentane, isopentane, neo-pentane, linear or branched C6 alkanes such as n-hexane, linear or branched C7 alkanes such as n-heptane, linear or branched C8 alkanes such as n-octane, linear or branched C9 alkanes such as n-nonane, linear or branched C10 alkanes such as n-decane, or linear or branched C11 alkanes such as n-undecane, linear or branched C12 alkanes such as dodecane. Exemplary aromatic hydrocarbons include, without limitation, benzene, toluene, xylenes, or other aromatic hydrocarbons.

The hydrocarbon mixture is chosen in such a way that the boiling process of the mixture gives rise to a straight or substantially straight line (linear or substantially linear) relationship between enthalpy and temperature over the temperature change of the direct heat exchange process or across the direct heat exchange apparatus. One experienced in the art will be able to choose a workable combination of four or more of the suggested components to comprise the heat transfer fluid mixture that allows a substantially straight line relationship between enthalpy and temperature for a given initial temperature heat source fluid and a given active heat exchange zone. The term substantially in the context means that the relationship departs from linearity by less than or equal to 20%. In other embodiments, the term means that the relationship departs from linearity by less than or equal to 15%. In other embodiments, the term means that the relationship departs from linearity by less than or equal to 10%. In other embodiments, the term means that the relationship departs from linearity by less than or equal to 5%. In other embodiments, the term means that the relationship departs from linearity by less than or equal to 2.5%. In other embodiments, the term means that the relationship departs from linearity by less than or equal to 1%.

The multi-component heat carrying fluid (or "multi-component heat carrier" fluid, hereafter MCHC fluid) is used in a direct contact heat exchanger which is a vertical oriented vessel. The vessel can be conceptually divided into three parts: (1) a top section, region or zone, where heated and vaporized MCHC accumulates; (2) a middle section, region or zone, where the heat source liquid and the MCHC come into direct contact in a counter-flow arrangement and components in the MCHC boil; (3) a lower section, region or zone, where the cooled heat source liquid accumulates, and (4) a bottom section, region or zone, where mineral precipitate accumulates. The lower and bottom sections of the vessel can be made of a larger diameter than the middle and top sections of the vessel. Increasing the diameter of the lower and bottom sections reduces a velocity of the brine as it settles into the lower section and the precipitate settles into the bottom section and provides additional time for any MCHC or component thereof that may have been carried down with the brine to float back up into middle section.

DETAILED DESCRIPTION OF THE DRAWINGS

First System Embodiment

Referring now to FIG. 1, a diagram of an embodiment of a system of this invention, generally 100, is shown to include a direct contact heat exchange subsystem 110, a heat exchange subsystem 160 and a heat utilization subsystem 180.

The direct contact heat exchange subsystem 110 includes a direct contact heat exchange apparatus DCHE. The apparatus DCHE includes an upper section 112, a middle section 114, a lower section 116 and a bottom section 118.

The middle section 114 includes a heat source inlet port 120 located at an upper portion 122 of the middle section 114 through which a pressure adjusted, heat source stream S10 having parameters as at a point 10 enters the direct contact heat exchange apparatus DCHE. Because the apparatus DCHE is a constant pressure apparatus, a pressure of an initial heat source stream S12 having parameters as at a point 12 is adjusted by passing the stream S12 through a first pump P1 to form the pressurize adjusted, heat source stream S10 having the parameters as at the point 10. In certain embodiments, the streams S10 and S12 comprises a highly mineralized geothermal brine, but the streams S10 and S12 can be any heat source stream, mineralized or not. In certain embodiments, the inlet port 120 includes a sprayer or other means for dispersing the stream S10 into droplets or a spray as it enters the middle section 114 of the apparatus DCHE.

Concurrently, a fully condensed, pressure adjusted multicomponent heat carrier (MCHC) fluid stream S14 having parameters as at a point 14 enters the apparatus DCHE through a MCHC inlet port 124 into at a lower portion 126 of the middle section 114 of the apparatus DCHE. Because the apparatus DCHE is a constant pressure apparatus, a pressure of a fully condensed MCHC stream S16 having parameters as at a point 16 is adjusted by passing the stream S16 through a second and circulating pump P2 to form the fully condensed, pressurize adjusted MCHC stream S14 having the parameters as at the point 14, which is in a state of slightly subcooled liquid.

In the middle section 114 of the apparatus DCHE, the heat source stream S10 and the MCHC stream S14 directly interact. Heat from the heat source stream S10 heats and vaporizes or partially vaporizes the MCHC stream S14. As the MCHC stream S14 has a lower density than the heat source stream S10, the MCHC stream S14 will move up the middle section 114 of the apparatus DCHE, while the heat source stream S10 will move down the middle section 114 of the apparatus DCHE. Of course, vaporized components of the MCHC stream S14 will rise very fast in the middle section 114 of the apparatus DCHE. The heated and vaporized or heat and partially vaporized MCHC stream S14 accumulates in the upper section 112 of the apparatus DCHE, while the cooled heat source stream S10 accumulates in the lower section 116 of the apparatus DCHE.

As the heat source stream S10 cools in contact with the MCHC stream S14 in the apparatus DCHE, minerals in the heat source stream S10 precipitate, but due to the configuration and design of the apparatus DCHE, the precipitate falls down through the middle section 114 of the apparatus DCHE and accumulates in the bottom section 118 due to a higher density of the solids. The bottom section 118 includes a solids removal port 128 through which accumulated solids can be intermittently, periodically, or continuously removed from the apparatus DCHE. The cooled heat source fluid that accumulates in the lower section 116 of the apparatus DCHE is withdrawn from or leaves the apparatus DCHE via a spent heat source stream port 130 positioned in an upper portion 132 of the lower section 116 as a spent heat source stream S18 having parameters as at a point 18.

A heated and fully or heated and partially vaporized MCHC stream S20 having parameters as at a point 20 that has accumulated in the upper section 112 of the apparatus DCHE is withdrawn through or leaves the apparatus DCHE via a MCHC outlet port 134 positioned at a top position 136 of the upper section 112. The heated and fully or partially vaporized MCHC stream S20 having parameters as at the point 20 is forwarded to the heat exchange subsystem 160. In this embodiment, the heat exchange subsystem 160 includes a single heat exchange apparatus HE. The heat exchange apparatus HE can be a single stage or multi staged heat exchanger or a single heat exchanger or a plurality of heat exchangers. In the heat exchange apparatus HE, the stream S20 having parameters as at the point 20 is brought into a counter flow, heat exchange relationship with a fully condensed working fluid stream S22 having parameters as at a point 22. Heat from the MCHC stream S20 is used to fully vaporize and in certain embodiments fully vaporize and superheat the working fluid stream S22. As a result of the heat exchange process 20-16 or 22-24, the fully condensed MCHC stream S16 having parameters as at a point 16 and a fully vaporized or fully vaporized and superheated, working fluid stream S24 having parameters as at a point 24 are formed.

The MCHC stream S16 then passes through the pump P2 and into the apparatus DCHE as described above, while the fully vaporized or fully vaporized and superheated, working fluid stream S24 is forwarded to the of the heat utilization subsystem 180. In this embodiment, the heat utilization subsystem 180 comprises a power generation system PS. The system PS includes a working fluid inlet port 182 and a working fluid outlet port 184. As the working fluid stream S24 having the parameters as at the point 24 passes through the system PS, a portion of its heat is converted into a usable form of energy producing the fully condensed working fluid stream S22 having the parameters as at the point 22. The power generation subsystem PS can be any power generation subsystem known in the art including those disclosed in U.S. Pat. Nos. 7,469,542; 7,458,218; 7,458,217; 7,398,651; 7,197,876; 7,065,969; 7,065,967; 7,055,326; 7,043,919; 7,021,060; 6,968,690; 6,941,757; 6,923,000; 6,910,334; 6,829,895; 6,820,421; 6,769,256; 6,735,948; 6,482,272; 5,953,918; 5,950,433; 5,822,990; 5,649,426; 5,572,871; 5,440,882; 5,103,899; 5,095,708; 5,029,444; 4,982,568; 4,899,545; 4,763,480; 4,732,005; 4,604,867; 4,586,340; 4,548,043; 4,489,563; 4,346,561; 4,331,202; and United States Published Application Nos. 20080053095, 20080000225, 20070234750, 20070234722, 20070068161, 20070056284, or any patent cited therein, all of which are incorporated by operation of the last paragraph of the detailed description.

Second System Embodiment

Figure 2:
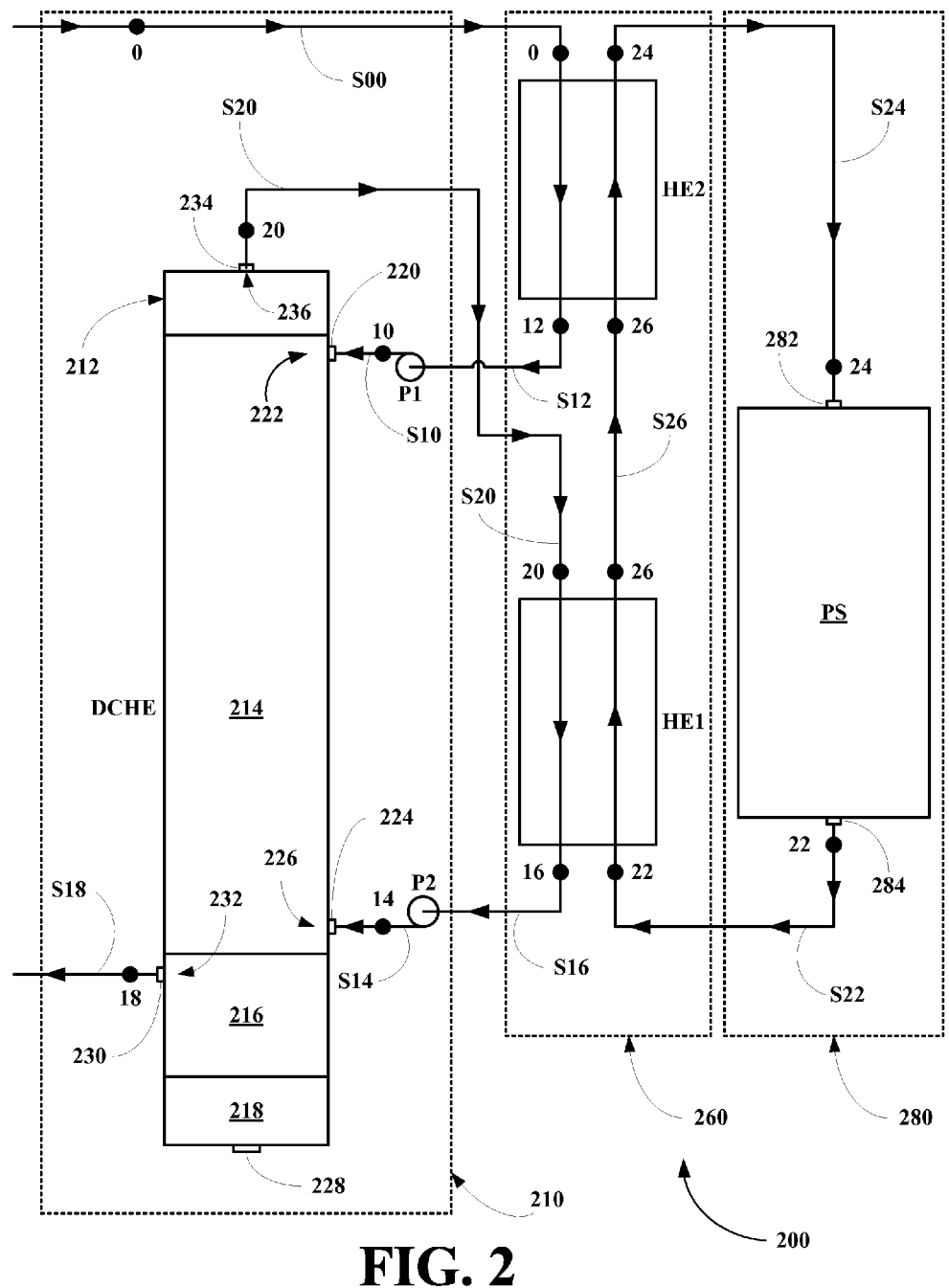
FIG. 2 depicts another embodiment of an integrated heat extraction and use system.

Referring now to FIG. 2, a diagram of an embodiment of a system of this invention, generally 200, is shown to include a direct contact heat exchange subsystem 210, a heat exchange subsystem 260 and a heat utilization subsystem 280.

The direct contact heat exchange subsystem 210 includes a direct contact heat exchange apparatus DCHE. The apparatus DCHE includes an upper section 212, a middle section 214, a lower section 216 and a bottom section 218.

The middle section 214 includes a heat source inlet port 220 located at an upper portion 222 of the middle section 214 through which a pressure adjusted, cooled heat source stream S10 having parameters as at a point 10 enters the direct contact heat exchange apparatus DCHE. In the current embodiment, an initial, hot heat source stream S00 having parameter as at a point 0 is cooled as described below to from a cooled heat source stream S12 having parameters as at a point 12. Because the apparatus DCHE is a constant pressure apparatus, a pressure of the cooled heat source stream S12 having parameters as at the point 12 is adjusted by passing the stream S12 through a first pump P1 to form the pressure adjusted, cooled heat source stream S10 having the parameters as at the point 10. In certain embodiments, the streams S10, S00 and S12 comprises a highly mineralized geothermal brine, but the streams S10, S00 and S12 can be any heat source stream, mineralized or not.

Concurrently, a fully condensed, pressure adjusted multi-component heat carrier (MCHC) fluid stream S14 having parameters as at a point 14 enters the apparatus DCHE through a MCHC inlet port 224 into at a lower portion 226 of the middle section 214 of the apparatus DCHE. Because the apparatus DCHE is a constant pressure apparatus, a pressure of a fully condensed MCHC stream S16 having parameters as at a point 16 is adjusted by passing the stream S16 through a second and circulating pump P2 to form the fully condensed, pressure adjusted MCHC stream S14 having the parameters as at the point 14, which is in a state of slightly subcooled liquid.

In the middle section 214 of the apparatus DCHE, the heat source stream S10 and the MCHC stream S14 directly interact. Heat from the heat source stream S10 heats and vaporizes or heats and partially vaporizes the MCHC stream S14. As the MCHC stream S14 has a lower density than the heat source stream S10, the MCHC stream S14 will move up the middle section 214 of the apparatus DCHE, while the heat source stream S10 will move down the middle section 214 of the apparatus DCHE. Of course, vaporized components of the MCHC stream S14 will rise very fast in the middle section 214 of the apparatus DCHE. The heated and vaporized or heated and partially vaporized MCHC stream S14 accumulates in the upper section 212 of the apparatus DCHE, while the cooled heat source stream S10 accumulates in the lower section 216 of the apparatus DCHE.

For mineralized heat source streams, as the heat source stream S10 cools in contact with the MCHC stream S14, minerals in the heat source stream S10 precipitate, but due to the configuration and design of the apparatus DCHE, the precipitate falls down through the middle section 214 of the apparatus DCHE and accumulates in the bottom section 218 due to a higher density of the solids. The bottom section 118 includes a solids removal port 228 through which accumulated solids can be intermittently, periodically, or continuously removed from the apparatus DCHE. The cooled heat source fluid that accumulates in the lower section 216 of the apparatus DCHE is withdrawn from or leaves the apparatus DCHE via a spent heat source stream port 230 positioned in an upper portion 232 of the lower section 216 as a spent heat source stream S18 having parameters as at a point 18.

A heated and fully vaporized or heated and partially vaporized MCHC stream S20 having parameters as at a point 20 that has accumulated in the upper section 212 of the apparatus DCHE is withdrawn through or leaves the apparatus DCHE via a MCHC outlet port 234 positioned at a top position 236 of the upper section 212. The heated and fully vaporized or heated and partially vaporized MCHC stream S20 having parameters as at the point 20 is forwarded to the heat exchange subsystem 260. In this embodiment, the heat exchange subsystem 260 includes a first heat exchange apparatus HE1 and a second heat exchange apparatus HE2. The heat exchange apparatuses HE1 and HE2 can be single stage or multi staged heat exchangers or can be a single heat exchanger or a plurality of heat exchangers. In the first heat exchange apparatus HE1, the stream S20 having parameters as at the point 20 is brought into a counter flow, heat exchange relationship with a fully condensed working fluid stream S22 having parameters as at a point 22, where heat from the MCHC stream S20 is used to heat or heat and partially vaporize the working fluid stream S22 to form the fully condensed MCHC stream S16 and a heated or heated and partially vaporized working fluid stream S26 having parameters as at a point 26. In the second heat exchange apparatus HE2, the hot heat source stream S00 having the parameters as at the point 0 is brought into a counter flow, heat exchange relationship with the heated or heated and partially vaporized S26 having the parameters 26 to form the cooled heat source stream S12 having parameters as at the point 12 and a fully vaporized or vaporized and superheated, working fluid stream S24 having parameters as at a point 24.

The MCHC stream S16 then passes through the pump P2 to form the stream S14, which enters the apparatus DCHE as described above, while the fully vaporized or fully vaporized and superheated, working fluid stream S24 is forwarded to the of the heat utilization subsystem 280. In this embodiment, the heat utilization subsystem 280 comprises a power generation system PS. The system PS includes a working fluid inlet port 282 and a working fluid outlet port 284. As the working fluid stream S24 having the parameters as at the point 24 passes through the system PS, a portion of its heat is converted into a usable form of energy producing the working fluid stream S22 having the parameters as at the point 22. Again, the power system can be any power system as described above.

First Heat Exchange System Embodiment

Figure 3A:
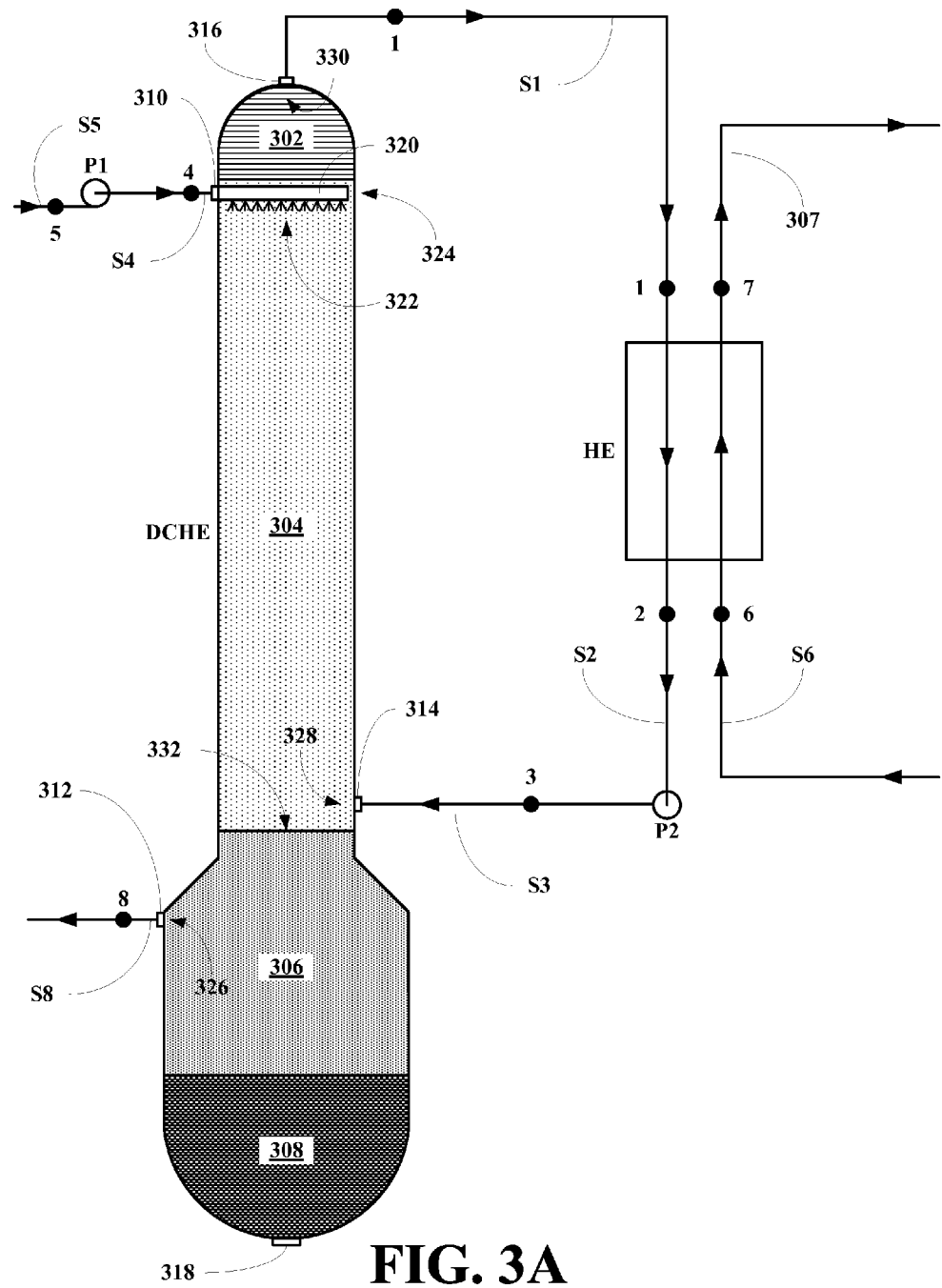
FIG. 3 depicts an embodiment of a direct heat exchange apparatus of this invention.

Referring now to FIG. 3A, a diagram of an embodiment of a heat exchange apparatus of this invention, generally 300, is shown to include a direct heat exchange apparatus DCHE, a heat exchange apparatus HE, a heat source pump P1 and a MCHC recirculating pump P2. The apparatus DCHE includes an upper section 302, a middle section 304, a lower section 306 and a bottom section 308. The apparatus DCHE also includes a heat source inlet port 310, a spent heat source outlet port 312, a MCHC inlet port 314, a MCHC outlet port 316 and a solids removal port 318. The apparatus DCHE also includes a spray member 320, which breaks a fluid stream into small substreams or droplets 322. The heat source inlet port 310 is positioned at an upper portion 324 of the middle section 304 of the apparatus DCHE, while the spent heat source outlet port 312 is positioned at an upper portion 326 of the lower section 306 of the apparatus DCHE. The MCHC inlet port 314 is positioned at a lower portion 328 of the middle section 304 of the apparatus DCHE, while the MCHC outlet port 316 is positioned at a top portion 330 of the upper section 302 of the apparatus DCHE.

A fully heated and fully or partially vaporized MCHC stream 51 having parameters as at a point 1 leaves the direct contact heat exchange apparatus DCHE and passes through the heat exchange apparatus HE. The heat exchange apparatus HE can comprise one heat exchanger or a plurality of heat exchangers or heat exchanges with a plurality of stages of a power system or other system that utilizes the heat.

In the apparatus HE, the MCHC stream 51 is condensed, releasing heat of a fully condensed working fluid stream S6 having parameters as at a point 6, and exits the apparatus HE in the form of a fully condensed liquid MCHC stream S2 with parameters as at point 2, while the working fluid exits as a fully vaporized or fully vaporized and superheated stream S7 having parameters as at a point 7.

The stream S2 having the parameters as at the point 2 is then sent into the circulating pump P2, where its pressure is increased forming a pressure adjusted, liquid MCHC stream S3 having parameters as at a point 3, which corresponds to a state of slightly subcooled liquid. The stream S3 is then sent into the direct contact heat exchanger DCHE through the MCHC inlet port 314. The stream S3 of MCHC enters the direct contact heat exchange apparatus DCHE towards a bottom (the lower portion 328) of the middle section 304.

Meanwhile, heat source liquid stream S5 (e.g., a geothermal brine) having parameters as at a point 5 is sent into the pump P1, where it's pressure is increased to a pressure that matches a pressure of the MCHC fluid in the direct contact heat exchange apparatus DCHE to form a pressure adjusted, heat source stream S4 having parameters as at a point 4. This increase in pressure is required so that the pressure of the heat source liquid stream S4 will be equal to the pressure of the MCHC liquid stream S3, which, since it has a low boiling point, will be at a pressure that is higher than the likely initial pressure of geothermal brine, (or for that matter, of any other likely heat source liquid). A useful side-effect of increasing the pressure of the heat source liquid S5 is that this prevents the presence of water-vapor in the direct contact heat exchange apparatus DCHE, thus avoiding considerable possible complications.

The heat source liquid stream S4 then enters the direct contact heat exchange apparatus DCHE through the port 310 and the spray device 320 at a top (the upper portion 324) of the middle section 304 of the direct contact heat exchange apparatus DCHE. The heat source fluid stream S4 is sprayed down toward the bottom of the direct contact heat exchange apparatus DCHE.

As the heat source fluid stream S4 flows through the sprayer 320, the stream S4 is broken into multiple substreams or droplets 322 which fall and sink through the MCHC stream S3 that was introduced into the direct contact heat exchange apparatus DCHE at the port 314.

These droplets of the heat source liquid stream S4 come into direct contact with the MCHC stream S3, causing components in the MCHC stream S3 to boil. Bubbles of the MCHC vapor and liquid MCHC move up through the direct contact heat exchange apparatus DCHE and components of the MCHC further vaporize as they move upwards, producing dry saturated MCHC vapor or wet MCHC vapor. This MCHC vapor accumulates in the top section 302 of the direct contact heat exchange apparatus DCHE and leaves via the top port 330 as the MCHC stream S1 having the parameters as at the point 1, which is in the state of a dry saturated or wet vapor as described above.

Meanwhile, the droplets of the heat source liquid stream S4, in the process of cooling, release dissolved minerals. The cooled heat source liquid stream S4 and the precipitated minerals sink to the lower section 306 and bottom sections 308 of the direct contact heat exchange apparatus DCHE, respectively. Here, the heat source liquid S4, which accumulates in the lower section 306, is removed from the direct contact heat exchange apparatus DCHE via the port 312 as a spent heat source stream S8 having parameters as at point 8, which is in the state of a subcooled liquid. Note that the port 312 through which the spent stream S8 leaves the apparatus DCHE is positioned below the port 314 through which the MCHC stream S3 enter the apparatus DCHE, so that the MCHC enters into the direct contact heat exchange apparatus DCHE above the point at which the heat source liquid stream S8 is removed. In this way, a level 332 of brine is always above the port 314 and thus no MCHC can exit through the brine outlet port 312.

The particles of precipitated minerals collect in the bottom section 308 of the direct contact heat exchange apparatus DCHE, in the form of a sludge which can be removed intermittently, periodically or continuously through a trap door 318 at a very bottom of the direct contact heat exchange apparatus DCHE.

Given that heat transfer coefficients of a direct contact heat transfer are very high, the temperature difference between the MCHC and the heat source liquid is very small. Due to the linear absorption of heat by the MCHC, these temperature differences can be maintained almost at a constant level throughout the entire process.

An additional advantage of the methods, systems and apparatuses is that the heat transfer (inside the heat exchange apparatus HE) from the MCHC stream S1 to the working fluid stream S6 of a power system occurs in a process of condensation which results in a drastic increase of the overall heat transfer coefficient in heat exchange apparatus HE and thus reduces the required size and cost of the heat exchanger apparatus HE.

The present methods, systems and apparatuses provide for efficient heat transfer from any heat source liquid with minimum losses of energy potential. It allows the heat source liquid to be cooled to any desired temperature without concern for mineralization or contamination of equipment by the heat source liquid.

Figure 3B:
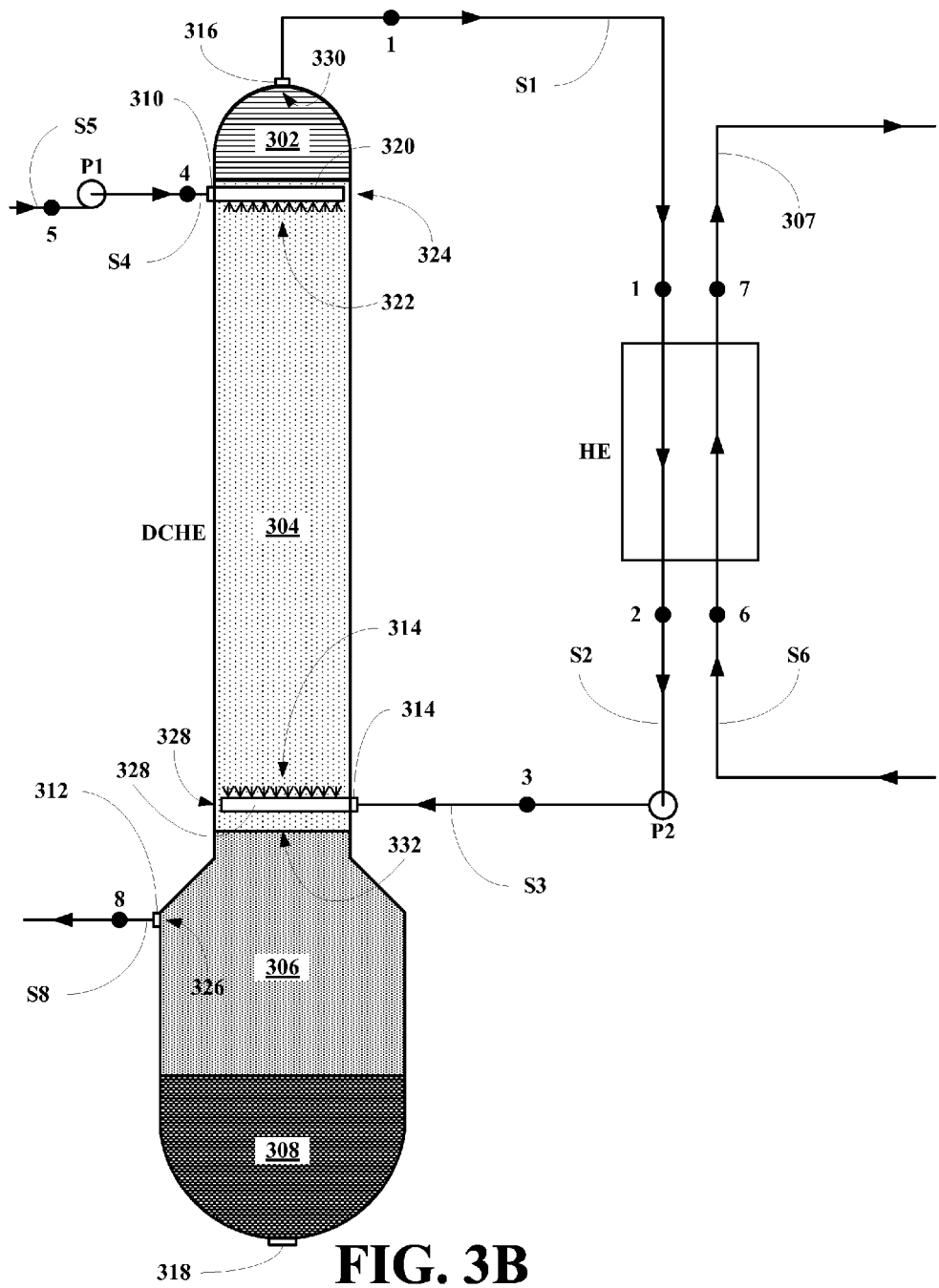

Referring now to FIG. 3B, an alternate, though less efficient, embodiment of the method, system or apparatus of this invention includes a MCHC stream spray device 334 located at the bottom portion 328 of the middle section 304 of the direct contact heat exchange apparatus DCHE. The MCHC stream S3 is sprayed up toward the top of the direct contact heat exchange apparatus DCHE. The heat source liquid stream S4 is introduced into the direct contact heat exchange apparatus DCHE at the top portion 324 of the middle section 304 with or without its sprayer 320 and is removed at the upper portion 326 of the lower section 306 of the apparatus DCHE, below the port 314 through which the MCHC stream S3 is introduced. This approach is less effective than the previous embodiment, but is none the less useable.

Second Heat Exchange System Embodiment

Figure 4:
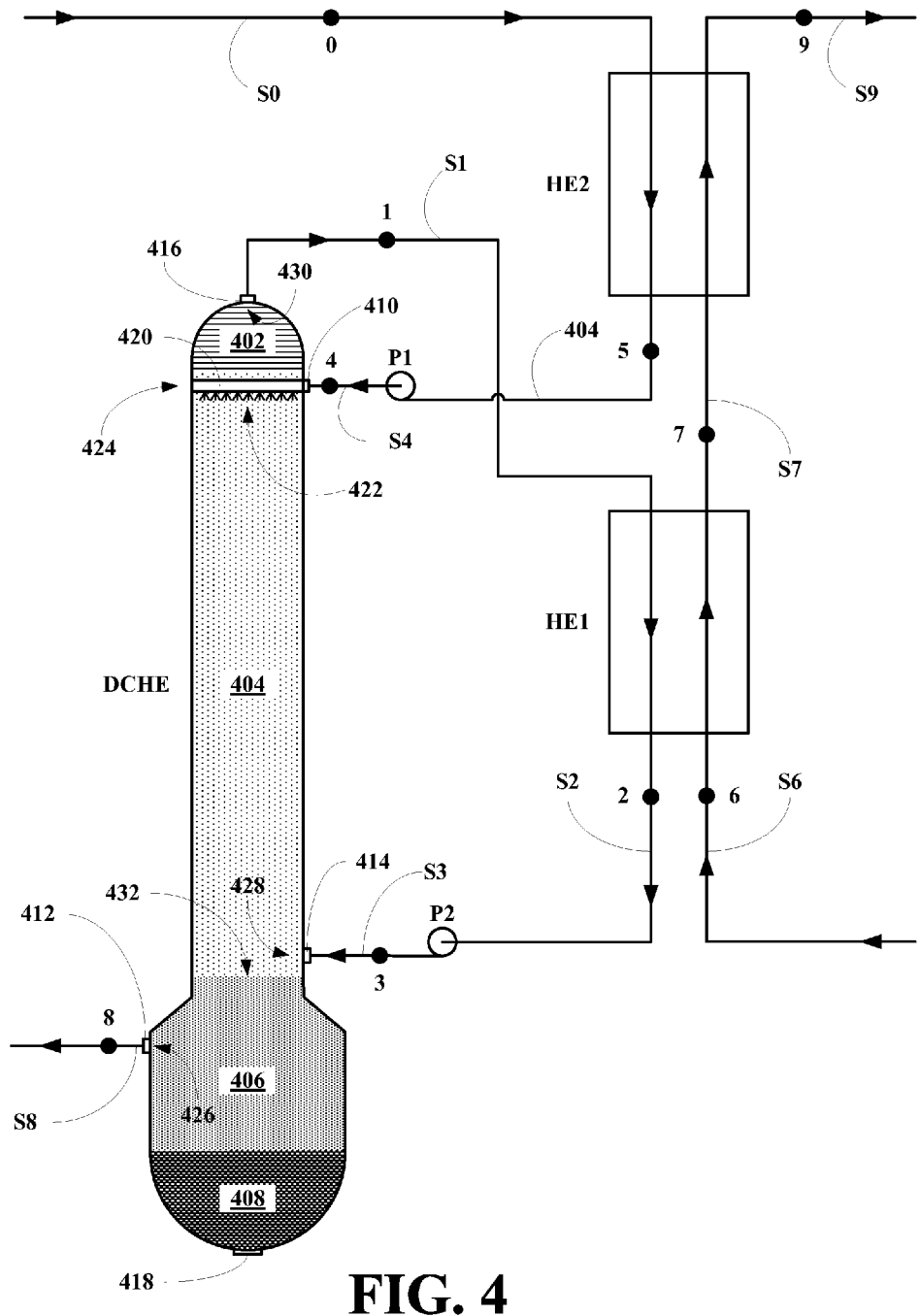
FIG. 4 depicts another embodiment of a direct heat exchange apparatus of this invention.

Referring now to FIG. 4, a diagram of an embodiment of a heat exchange apparatus of this invention, generally 400, is shown to include a direct heat exchange apparatus DCHE, a heat exchange apparatus HE, a heat source pump P1 and a MCHC recirculating pump P2. The apparatus DCHE includes an upper section 402, a middle section 404, a lower section 406 and a bottom section 408. The apparatus DCHE also includes a heat source inlet port 410, a spent heat source outlet port 412, a MCHC inlet port 414, a MCHC outlet port 416 and a solids removal port 418. The apparatus DCHE also includes a spray member 420, which breaks a fluid stream into small substreams or droplets 422. The heat source inlet port 410 is positioned at an upper portion 424 of the middle section 404 of the apparatus DCHE, while the spent heat source outlet port 412 and sprayer 420 are positioned at an upper portion 426 of the lower section 406 of the apparatus DCHE. The MCHC inlet port 414 is positioned at a lower portion 428 of the middle section 404 of the apparatus DCHE, while the MCHC outlet port 416 is positioned at a top portion 430 of the upper section 402 of the apparatus DCHE.

A heated and fully vaporized or heated and partially vaporized MCHC stream 51 having parameters as at the point 1 is withdrawn from the port 416 of the apparatus DCHE and forwarded to the a first heat exchange apparatus HE1. In the first heat exchange apparatus HE1, the stream 51 having parameters as at the point 1 is brought into a counter flow, heat exchange relationship with a fully condensed working fluid stream S6 having parameters as at a point 6. Heat from the MCHC stream 51 is used to heat or heat and partially vaporize the working fluid stream S6 to form a fully condensed MCHC stream S2 having parameters as at a point 2 and a heated or heated and partially vaporized working fluid stream S7 having parameters as at a point 7.

The MCHC stream S2 having the parameters as at the point 2 is then sent into the recirculating pump P2, where its pressure is increased forming a pressure adjusted, liquid MCHC stream S3 having parameters as at a point 3, which corresponds to a state of slightly subcooled liquid. The stream S3 is then sent into the direct contact heat exchanger DCHE through the MCHC inlet port 414. The stream S3 of MCHC enters the direct contact heat exchange apparatus DCHE towards a bottom (the lower portion 428) of the middle section 404.

Meanwhile, in a second heat exchange apparatus HE2, a hot heat source stream S00 having the parameters as at a point 0 is brought into a counter flow, heat exchange relationship with the heated or heated and partially vaporized S7 having the parameters as at the point 7 to form a cooled heat source stream S5 having parameters as at a point 5 and a fully vaporized or fully vaporized and superheated, working fluid stream S9 having parameters as at a point 9. The heat exchange apparatuses HE1 and HE2 can be single stage or multi staged heat exchangers or can be a single heat exchanger or a plurality of heat exchangers.

The heat source liquid stream S5 (e.g., a geothermal brine) having parameters as at the point 5 is sent into the pump P1, where it's pressure is increased to a pressure that matches a pressure of the MCHC fluid stream S3 in the direct contact heat exchange apparatus DCHE to form a pressure adjusted, heat source stream S4 having parameters as at a point 4. This increase in pressure is required so that the pressure of the heat source liquid will be equal to the pressure of the MCHC liquid, which, since it has a low boiling point, will be at a pressure that is higher than the likely initial pressure of geothermal brine, (or for that matter, of any other likely heat source liquid). A useful side-effect of increasing the pressure of the heat source liquid is that this prevents the presence of water-vapor in the direct contact heat exchange apparatus DCHE, thus avoiding considerable possible complications.

The heat source liquid stream S4 then enters the direct contact heat exchange apparatus DCHE through the spray device 420 at a top (the upper portion 424) of the middle section 404 of the direct contact heat exchange apparatus DCHE. The heat source fluid is sprayed down toward the bottom of the direct contact heat exchange apparatus DCHE.

As the heat source fluid stream S4 flows through the sprayer 420, the stream S4 is broken into multiple droplets or substreams 422 which fall and sink through the MCHC stream S3 having the parameters as at the point 3 that was introduced into the direct contact heat exchange apparatus DCHE at the port 414.

These droplets 422 of the heat source liquid stream S4 come into direct contact with the MCHC stream S3, causing components in the MCHC stream S3 to boil. Bubbles of the MCHC vapor and liquid MCHC move up through the direct contact heat exchange apparatus DCHE and components of the MCHD further vaporize as they move upwards, producing dry saturated MCHC vapor or wet MCHC vapor. This MCHC vapor accumulates in the top section 402 of the direct contact heat exchange apparatus DCHE and leaves via the top port 416 as the MCHC stream S1 having the parameters as at the point 1, in the state of a dry saturated or wet vapor as described above.

Meanwhile, the droplets of the heat source liquid stream S4, in the process of cooling, release dissolved minerals. The cooled heat source liquid stream S4 and the precipitated minerals sink to the lower section 406 and bottom sections 408 of the direct contact heat exchange apparatus DCHE. Here, the heat source liquid, which accumulates in the lower section 406, is removed from the direct contact heat exchange apparatus DCHE via the port 412 as a spent heat source stream S8 having parameters as at point 8, which is in the state of a subcooled liquid. Note that the port 412 through which the spent stream S8 leaves the apparatus DCHE is positioned below the port 414 through which the MCHC stream S3 enter the apparatus DCHE, so that the MCHC enters into the direct contact heat exchange apparatus DCHE above the point at which the heat source liquid stream S8 is removed. In this way, a level 432 of the brine is always above the port 414 and thus no MCHC can exit through the brine outlet port 412.

The particles of precipitated minerals collect at the bottom section 308 of the direct contact heat exchange apparatus DCHE, in the form of a sludge which can be removed intermittently, periodically or continuously through a trap door 318 at a very bottom of the direct contact heat exchange apparatus DCHE.

Given that heat transfer coefficients of a direct contact heat transfer are very high, the temperature difference between the MCHC and the heat source liquid is very small. Due to the linear absorption of heat by the MCHC, these temperature differences can be maintained almost at a constant level throughout the entire process.

A characteristic of the method, system and apparatus of this invention is that the heat transfer (inside of the apparatus HE1) from the MCHC to the working fluid of a power system occurs in the process of condensation, which results in a drastic increase of the overall heat transfer coefficient in the apparatus HE1 and thus reduces the required size and cost of the heat exchanger apparatus that makes up the apparatus HE1.

The systems of this invention provide for efficient heat transfer from any heat source liquid with minimum losses of energy potential. It allows the heat source liquid to be cooled to any desired temperature without concern for mineralization or contamination of equipment by the heat source liquid.

An alternate, though less efficient embodiment of the proposed system can be designed so that the MCHC is sent in to the direct contact heat exchanger through a spray device at the bottom of the middle section of the direct contact heat exchanger. The MCHC is sprayed up toward the top of the direct contact heat exchanger. Heat source liquid is introduced into the direct contact heat exchanger at the top of the middle section and is removed at the bottom, below the point at which the MCHC is introduced. This approach is less effective than the preferred embodiment of the proposed invention, but is none the less useable.

Figure 5:
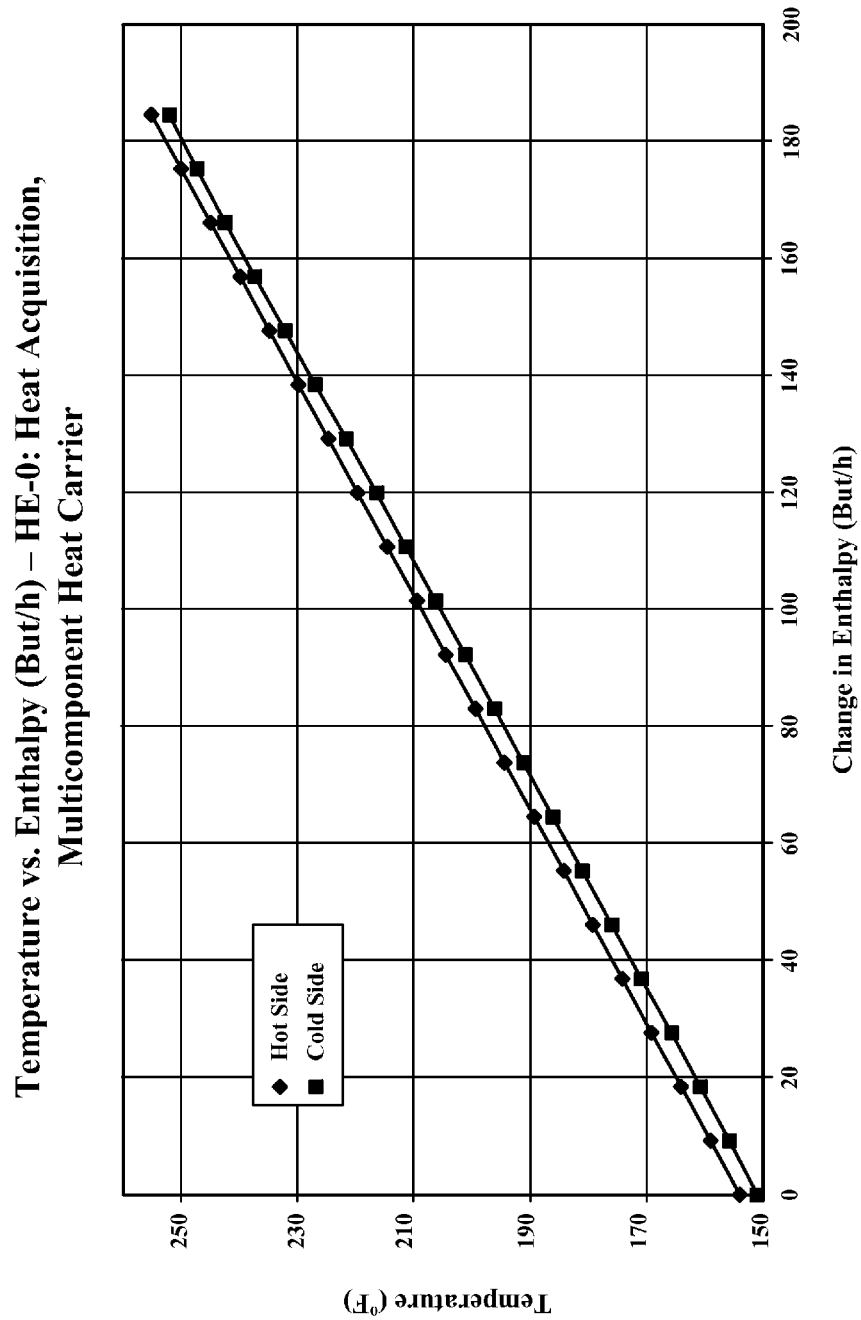
FIG. 5 depicts a plot of several multi-component heat carrier fluids having a linear enthalpy to temperature relationship over a temperature range between about 150° F. and 260° F.

A graph of the process of heat exchange between the heat transfer fluid and the heat source fluid is given in FIG. 5. For FIG. 5, the MCHC fluid comprised, by weight, 0.2 isobutane, 0.3 pentane, 0.35 hexane and 0.25 octane, for a weight ratio of isobutane:pentane:hexane:octane of 2:3:3.5:2.5. The pressure of the MCHC was 60 psi at the boiling point and 57 psi at the dew point. While these composition was constructed to produce a fluid have a linear enthalpy versus temperature relationship over the temperature range of about 150° F. to about 260° F. One of ordinary skill in the art can construct a suitable mixture of solvent or fluids that have a linear enthalpy to temperature relationship over a given temperature range. The boiling points for isobutane, pentane, hexane and octane are 11° F., 97° F., 156° F. and 258° F. If you wanted to lower the temperature range you could substitute heptane, boiling point 209° F. If you wanted to raise the temperature range, you could butane, boiling point 40° F., isohexane, boiling 140.5° F., isooactane, boiling point 211° F., or heptane, boiling point 209° F., and nonane, boiling point 313° F. The weight ratios will generally range between 1:1:1:1 to about 1:1.5:2:1.5, however, other weight ratios are possible depending on the compounds used and on the temperature range desired. Of course, as is clearly set forth in the embodiments of FIG. 2 and FIG. 4, if the heat source fluid is outside the temperature, i.e., is too hot, the temperature of the fluid can be reduced by first passing the stream through a traditional heat exchanger, provided that the temperature is not reduced below the precipitation temperature of the heat source fluid.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method comprising:
pressurizing a heat source stream to a pressure equal to a pressure to a multi-component heat carrier (MCHC) fluid to form a pressure, adjusted heat source stream,
forwarding the pressure, adjusted heat source stream to a heat source inlet port of a direct heat exchange apparatus located in an upper portion of a middle section of the direct heat exchange apparatus,
concurrently, forwarding a pressure adjusted, fully condensed multi-component heat carrier (MCHC) stream to a MCHC inlet port of the direct heat exchange apparatus located at a lower portion of the middle section of the direct heat exchange apparatus, where the MCHC fluid has a lower density than the heat source stream,
exchanging heat between the heat source stream and the MCHC stream in the direct heat exchange apparatus as the MCHC fluid rises in the direct heat exchange apparatus and the heat source stream falls in the direct heat exchange apparatus,
accumulating a MCHC saturated vapor or a MCHC partially vaporized fluid in an upper section of the direct heat exchange apparatus,
accumulating the cooled heat source fluid in a lower section of the direct heat exchange apparatus,
accumulating a mineral precipitate in a bottom section of the direct heat exchange apparatus,
withdrawing a spent heat source stream from the lower section of the direct heat exchange apparatus via a heat source outlet port located in an upper portion of the lower section of the direct heat exchange apparatus below the MCHC inlet,
withdrawing the saturated MCHC vapor from the direct heat exchange apparatus as a MCHC saturated vapor stream or a partially vaporized MCHC stream via a MCHC outlet port located in a top portion of the upper section of the direct heat exchange apparatus,
passing the MCHC saturated vapor stream or a partially vaporized MCHC stream through a heat exchange apparatus in counter-flow with a fully condensed working fluid stream to form a fully condensed MCHC stream and a fully vaporized or fully vaporized and superheated working fluid stream, and
passing the fully condensed MCHC stream through a circulating pump to adjust the pressure of the stream to an entry pressure to form the pressure adjusted, fully condensed MCHC stream.

2. The method of claim 1, further comprising:
converting a portion of the heat in the fully vaporized or fully vaporized and superheated working fluid stream into a usable form of energy in an energy extraction subsystem.

3. The method of claim 1, wherein the MCHC fluid comprises at least four components mixed in a weight ratio having linear enthalpy to temperature relationship over an operating temperature range of the direct heat exchange apparatus.

4. The method of claim 1, wherein the heat source inlet port includes a sprayer for breaking the heat source fluid into droplets or jets and wherein the heat exchange apparatus comprises a single heat exchanger, a plurality of heat exchangers, or a multi-stage heat exchanger.

5. The method of claim 1, wherein the heat source inlet port includes a sprayer for breaking the heat source fluid into droplets or jets.

6. The method of claim 1, wherein the heat exchange apparatuses comprise a single heat exchanger, a plurality of heat exchangers, or a multi-stage heat exchanger.

7. A method comprising:
passing a hot heat source stream through a first heat exchange apparatus in counter flow heat exchange relationship with a heated or heated and partially vaporized working fluid stream to form a fully vaporized or fully vaporized and superheated working fluid stream and a cooled heat source stream,
pressurizing the cooled heat source stream to a pressure equal to a pressure to a multi-component heat carrier (MCHC) fluid to form a pressure, adjusted cooled heat source stream,
forwarding the pressure, adjusted heat source stream to a heat source inlet port of a direct heat exchange apparatus located in an upper portion of a middle section of the direct heat exchange apparatus,
concurrently, forwarding a pressure adjusted, fully condensed multi-component heat carrier (MCHC) stream to a MCHC inlet port of the direct heat exchange apparatus located at a lower portion of the middle section of the direct heat exchange apparatus, where the MCHC fluid has a lower density than the heat source stream,
exchanging heat between the heat source stream and the MCHC stream in the direct heat exchange apparatus as the MCHC fluid rises in the direct heat exchange apparatus and the heat source stream falls in the direct heat exchange apparatus,
accumulating a MCHC saturated vapor or a MCHC partially vaporized fluid in an upper section of the direct heat exchange apparatus,
accumulating the cooled heat source fluid in a lower section of the direct heat exchange apparatus,
accumulating a mineral precipitate in a bottom section of the direct heat exchange apparatus,
withdrawing a spent heat source stream from the lower section of the direct heat exchange apparatus via a heat source outlet port located in an upper portion of the lower section of the direct heat exchange apparatus below the MCHC inlet,
withdrawing the saturated MCHC vapor from the direct heat exchange apparatus as a MCHC saturated vapor stream or a partially vaporized MCHC stream via a MCHC outlet port located in a top portion of the upper section of the direct heat exchange apparatus,
passing the MCHC saturated vapor stream or a partially vaporized MCHC stream through a second heat exchange apparatus in counter-flow with a fully condensed working fluid stream to form a fully condensed MCHC stream and a heated or heated and partially vaporized working fluid stream, and passing the fully condensed MCHC stream through a circulating pump to adjust the pressure of the stream to an entry pressure to form the pressure adjusted, fully condensed MCHC stream.

8. The method of claim 7, further comprising:

converting a portion of the heat in the fully vaporized or fully vaporized and superheated working fluid stream into a usable form of energy in an energy extraction subsystem.

9. The method of claim 7, wherein the MCHC fluid comprises at least four components mixed in a weight ratio having linear enthalpy to temperature relationship over an operating temperature range of the direct heat exchange apparatus.

* * * * *